United States Patent [19]

Tajima

[11] Patent Number: 5,268,575
[45] Date of Patent: Dec. 7, 1993

[54] INFRARED OBSERVING SYSTEM

[75] Inventor: Masami Tajima, Kawasaki, Japan

[73] Assignee: Fujitsu Limited, Kawasaki, Japan

[21] Appl. No.: 920,889

[22] Filed: Jul. 28, 1992

[30] Foreign Application Priority Data

Jul. 29, 1991 [JP] Japan .................... 3-212668

[51] Int. Cl.[5] .............................................. H04N 5/33
[52] U.S. Cl. ...................................... 250/330; 250/334
[58] Field of Search ................. 250/334, 332, 330

[56] References Cited

U.S. PATENT DOCUMENTS

| | | | |
|---|---|---|---|
| 3,760,181 | 9/1973 | Daly et al. | 250/332 |
| 4,675,532 | 6/1987 | Carson | 250/332 |
| 4,808,822 | 2/1989 | Manning et al. | 250/332 |

OTHER PUBLICATIONS

The Design of an Active Filter, By T. Yanagisawa, Jun. 1, 1974 2nd ed. pp. 25–31 esp. p. 27 L. 1–2.

Primary Examiner—Carolyn E. Fields
Attorney, Agent, or Firm—Armstrong, Westerman, Hattori, McLeland & Naughton

[57] ABSTRACT

An infrared observing system is provided such that, after an infrared-ray emitted from an optical/scanning system is converted into an infrared-ray image signal by an infrared detector, an unnecessary high frequency component of the infrared image signal is filtered by a lowpass filter to cut off a high frequency region noise and the output thereof is represented on a display unit. Before or after the lowpass filter, a highpass filter is provided that has a reverse frequency transfer characteristic to a first inclination attenuated frequency transfer characteristic.

4 Claims, 7 Drawing Sheets

INFRARED OBSERVING SYSTEM

BACKGROUND OF THE INVENTION

1. Field of the Invention

The present invention relates to an infrared observing system, and more particularly to a system for representing a connected high frequency component of an infrared image signal by the completion of a flat frequency transfer characteristic as a whole. Thus, the possibility of a quantitative system design leads to high resolution and low cost.

2. Description of the Related Art

In general, when a light detection output is represented by an infrared-ray video signal, it is necessary that a frequency transfer characteristic of the infrared-ray video signal be made flat all over the system so that the display unit representation is correct temperature information that can be easily seen.

In a prior art design technique for infrared-ray observing equipment, an MTF (modulation transfer function) of frequency transfer characteristics in relation to an optical and scanning system does not reduce the frequency characteristics in a high frequency region (viz., a resolution) so as to keep it flat; the MTF on an infrared detector is made flat and the MTF in relation to a low pass filter in an electric circuit system is devised to prevent high frequency region noise in an analog-to-digital conversion from falling to a low frequency region by sampling.

Nevertheless, a conventional infrared observation system has a problem in that, based on an aberration of the optical system, scanning distortion and linearity of the scanning system, and an area of the infrared detector or the like, their transfer characteristics that are dependent on spatial frequency will deteriorate. Accordingly, when a signal that makes the resolution change at a necessary high speed is passed thereto, the frequency component in the high frequency region is attenuated to produce a signal in which the waveform is made round on the time axis (a signal such that the energy in a high frequency region is extracted therefrom), the amplitude is reduced, and thus a representation that is sharp as a picture image (a change or an edge cannot be discriminated) cannot be provided.

In the prior art, since frequency compensation in the whole system of the device is not taken into account for from the beginning of design, the design is effected by a cut-and-try method and directed to provide for the compensation only by a performance allowance such as NETD (noise equivalent target temperature difference). Therefore, a compensation circuit is too complex and thereby results in an ineffective and a halfway compensation because of lack of filter space. In the conventional device, the above compensation method or an equalizing method was not carried out because a noise that has no frequency characteristic is over-emphasized in the high frequency region after equalizing, to thereby increase the total noise, sensitivity is reduced, and accordingly, it is necessary to improve the performance required of the detector. Also, the NETD of the device, the sensitivity of which is endowed with more importance than easy viewing of the picture image, is considered an essential performance feature and evaluating and testing all systems of the device is generally performed visually. Finally, a quantitative design procedure for the compensation has not yet been found.

From the above, until the infrared energy from the target object is reflected on the displayed screen and enters the human eye, the design that makes the total frequency characteristics flat (viz., equalizing) by the mutual compensated design between the components of the system considered has not been set out, the high frequency region of transfer characteristics for the infrared observing system is always lowered in spite of consecutive labor, the integrated performance of the image ordinarily reflected does not harmonize therewith, the image does not have a strong appeal and the edge or the like is not sharp and it is very hard to view the picture image.

Therefore, in an infrared-ray observation device that, after an infrared-ray from the optical and scanning system is converted into an infrared-ray image signal by the infrared-ray detector, the high frequency component of the infrared-ray image signal is filtered by a low pass filter to cut-off a high frequency region noise and display the output on the display unit, and an object of the present invention is to provide an infrared observing system that, even if the sensitivity of the device, viz., NETD has more or less deteriorated, the frequency characteristic is rendered flat to thereby obtain a correct and obvious picture image in conformity with temperature information of an incoming infrared-ray.

SUMMARY OF THE INVENTION

In accordance with a feature of the present invention, there is provided an infrared observing system that, after an infrared-ray emitted from an optical/scanning system is converted into an infrared-ray image signal by an infrared detector, an unnecessary high frequency component of said infrared image signal is filtered by a lowpass filter to cut off a high frequency region noise and the output thereof is represented on a display unit, wherein before said lowpass filter, a highpass filter that has reverse frequency transfer characteristics to first inclination attenuated frequency transfer characteristics is provided.

BRIEF DESCRIPTION OF THE DRAWINGS OF THE INVENTION

PREFERRED EMBODIMENT OF THE INVENTION

With reference to the drawings, a prior art and an embodiment of the present invention will be described in detail.

Figure 1:
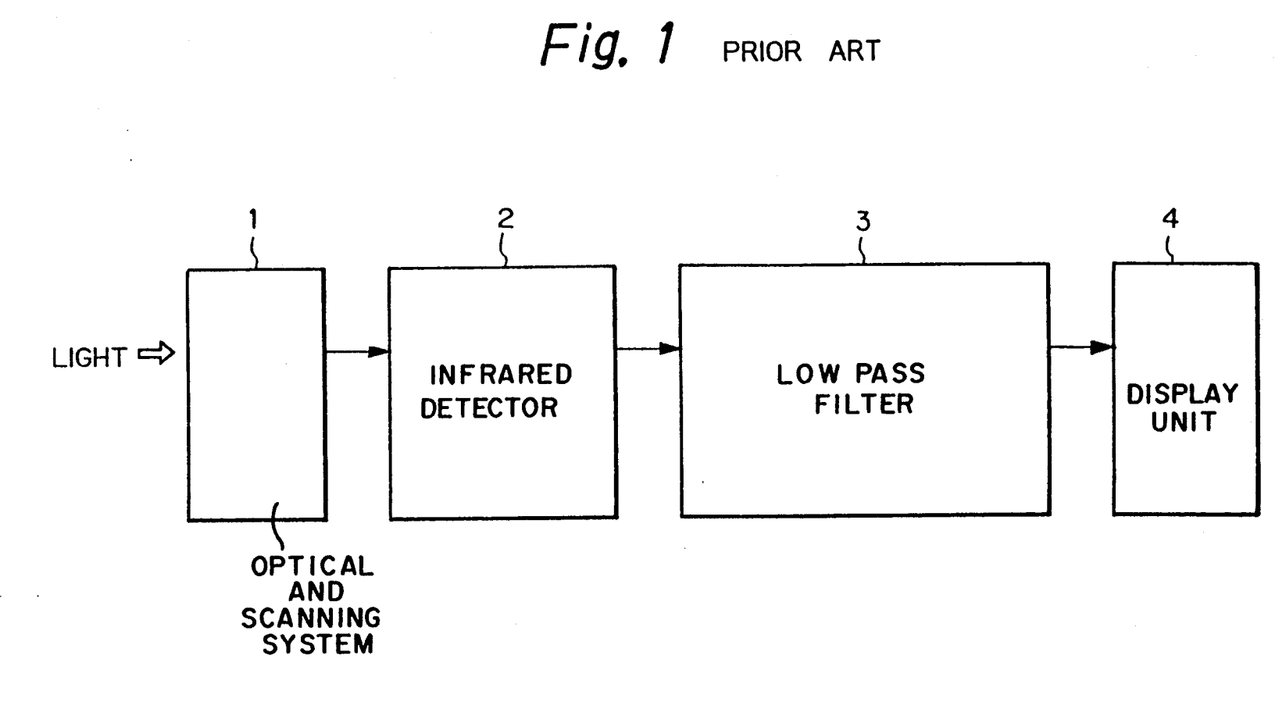
FIG. 1 is a block diagram of a prior art infrared observing system.

FIG. 1 is a block diagram of a prior art infrared observation device. Reference numeral 1 denotes an optical and scanning system with respect to an optical input, 2 an infrared detector as a photoelectric converter for converting an infrared-ray output from the optical and scanning system 1 into an infrared image signal, 3 a lowpass filter for cutting off a high frequency component of the infrared image signal output from the infrared detector and 4 a display unit for display-representing an output signal from the lowpass filter or a passband filter 3. In practice, an amplifier circuit having a flat frequency characteristic and a DC restorer are provided with the lowpass filter 3 as an electrical circuit system (not shown in the figure) in a front stage.

When the infrared observation device is conventionally designed, the frequency characteristic in a high frequency region of the modulation transfer function (MTF) of the frequency transfer characteristic is made as flat as possible in relation to the optical and scanning system 1; the MTF of the infrared detector 2 is also made flat and the lowpass filter 3 in the electric circuit system 11 is devised such that the high frequency region noise in an analog-to-digital conversion does not fall into a low frequency region.

Nevertheless, there is a problem with regard to a conventional infrared observation device in that, based on an aberration of the optical system., scanning distortion and linearity of the scanning system, an area of the infrared detector or the like, their transfer characteristics will deteriorate dependent on the spatial frequency. Therefore, when a signal that makes the resolution change with a necessary high speed passes thereto, the frequency component in the high frequency region is attenuated to produce a signal in which the waveform is made round on the time axis, the amplitude is reduced, and a display that has a sharp picture image contour cannot be provided (a change or an edge cannot be keenly discriminated).

Using the modulation transfer function (MTF), the problem will be described in detail hereinafter.

A transfer function MTFO of an optical and scanning system 1 and a transfer function MTFD of an infrared detector 2 are represented by an experimental equation as follows.

(1) A transfer function of an optical and scanning system 1

$$MTFO = O(f) = 1 - fs/P_o, \ldots \quad (1)$$

where fs is a spatial frequency (cycle/rad) and $P_o$ is a calculation coefficient of an optical system MTF.

(2) A transfer function MTFD of an infrared detector 2 is represented by a so-called SINC function.

$$MTFD = D(f)\{\sin(\pi \cdot f_s \cdot \Omega)\}/(\pi \cdot f_s \cdot \Omega) = \sin c(\pi \cdot f_s \cdot \Omega), \quad (2)$$

where $\Omega$ is an instantaneous field of view (rad) and $$\Omega = 2 \tan^{-1} \frac{\sqrt{A}/2}{F} = \frac{d}{F}, \quad \left(\frac{d}{F} << 1\right),$$

where F is a focus length and A is an area square of an infrared detector.

The relationship between spatial frequency fs and electrical system frequency (video frequency) f is expressed by the following equation.

$$f = \theta \cdot f_s / T \cdot \eta, \ldots \quad (3)$$

where $\theta$ is a field of view (rad), $f_s$ spatial frequency (cycle/rad), T scanning time (sec) and $\eta$ scanning efficiency.

For example, in the case of an artificial satellite, if a height is 705 km, a scanning width is 90 km, a ground pixel is 90m square, and the field of view is nearly 90,000/705,000 (rad), the maximum spatial frequency $f_s$ is $$fs = [90.000/(90 \times 2)]/(90.000/705.000) = 3916,667 \text{ (cycle/rad)}.$$

Then, if $T = 131 \times 10^{-3}$ (sec) and $\eta = 0.5$, an electrical system frequency f is given by the video signal maximum frequency $f_{max}$ as follows $$f_{max} = [(90/705)/131 \times 10^{-3} \times 0.5] \cdot [90,000/(90 \times 2)]/(90/705) = 7,633.6 \text{(Hz)}.$$

Figure 2:
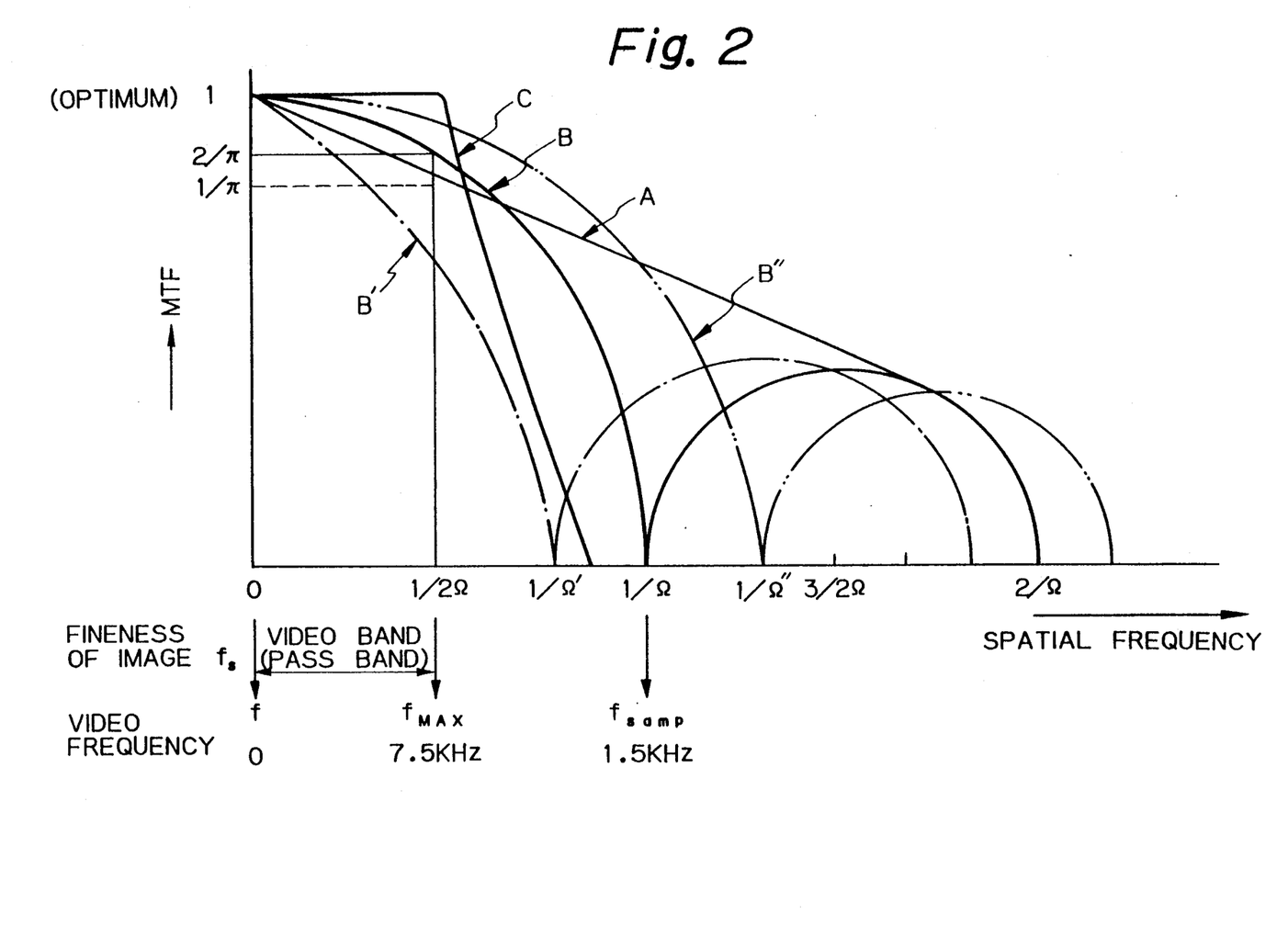
FIG. 2 illustrates an MTF (modulation transfer function) characteristic of each component of the infrared observing system in FIG. 1.

FIG. 2 illustrates a modulation transfer function (MTF) characteristic of each component of the infrared observing system in FIG. 1. A characteristic curve A shown by a solid line denotes a frequency transfer function characteristic of a first inclination attenuated straight line in the optical and scanning system 1 corresponding to the above formula (1).

A characteristic curve B shown by a solid line illustrates a characteristic of the infrared detector 2 corresponding to the above formula (2). An infrared-ray emitted from an observation face (a target object or an earth surface) through a telescope in an optical system is condensed into a very small area of an infrared sensor to be photoelectric-converted into an electric signal. Suppose that an infrared observation device that senses and scans all areas and all surfaces observed by a very small area of window (for example, a square form having a uniform sensitivity) by means of an instantaneous field of view $\Omega$, is provided. Since the window in the infrared detector has a square form and has uniform sensitivity, the transfer function of the window function will be a SINC function and accordingly as spatial frequency becomes high, the transfer frequency response on a sole detector will deteriorate.

Therefore, when the area of the infrared detector 2 is wider, the quantity of light or the time integral amount increases and the sensitivity also increases with respect to the frequency transfer characteristic of the infrared detector 2, but the frequency transfer characteristic MTF deteriorates. On the contrary, when the area of the infrared detector 2 is small, the frequency transfer characteristic MTF improves as a two-dot chain line B'', the quantity of light is reduced and sensitivity drops, thereby making it impossible to use.

In a prior art infrared observation device, a lowpass filter (LPF) 3 having a frequency transfer characteristic, such as a characteristic curve C shown by a solid line is provided, so that it may prevent noise in a high frequency region, in the case of an analog-to-digital conversion, from falling into a low frequency region on account of sampling, or in order that an observer may view an after-completed image and provide more emphasis to the high frequency region. Nevertheless, the above correction is not quantitative and makes the frequency characteristic in the high frequency region raise only slightly and improves the appearances thereof. In such cases, a high frequency region of the frequency transfer characteristic MTF of an electrical circuit system represented by a lowpass filter is increased and integrated into a complete article by means of a cut-and-try method. Further, such cut-and-try method can be adopted and applied only when there is some allowance in a noise equivalent (target) temperature difference (NETD, which is regarded as a temperature difference between an object and the background or between the objects when a total signal-to-noise ratio is equal to 1). The counter measure in such a case is to empirically insert a circuit, such as a Chebyshev type lowpass filter, to emphasize the characteristic in the high frequency region and prevent the infrared signal having high spatial frequency energy from reducing the transfer rate, but this method serves only to improve the resolution to some extent.

From the above, since the frequency compensation in all systems of the device is not taken into consideration from the beginning of the design, a temporary expedient, performed without rehearsal, or a cut-and-try method is adopted, and the only allowance of performance such as the NETD of the completed device can contribute to the compensation. Therefore, a compensation circuit is too complex in design and, there is no space for housing a filter after completion, thereby producing imperfect compensation and the design is incomplete.

The present invention is devised so as to cancel the prior art disadvantages and even if the NETD or the sensitivity deteriorates, the frequency characteristics are made flat and a correct and an easy-to-see image can be obtained in conformity with the temperature information of an incoming infrared-ray.

In the frequency transfer characteristic of the optical and scanning system and the frequency transfer characteristic of a signal transfer system of the device, such as an infrared detector, the frequency transfer characteristics in a high frequency region generally are lowered as described above, and since it costs too much to manufacture the optical and scanning system and the infrared detector in order to make the frequency transfer characteristic thereof flat up to the high frequency region separately, the present invention intends to utilize a low cost electrical circuit to correct some lowering and variation in the high frequency region of a respective characteristic.

Figure 3:
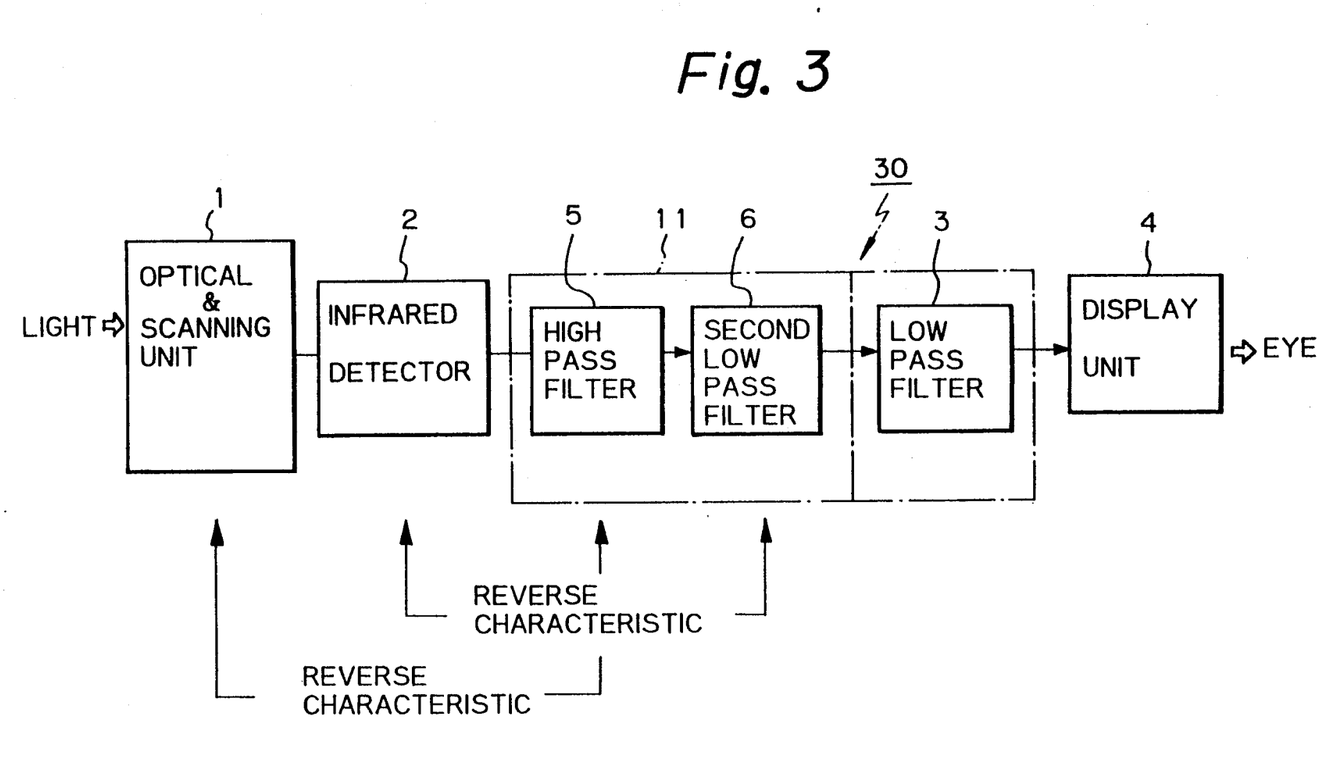
FIG. 3 is a block diagram showing an outlined configuration of an infrared observing system in accordance with the present invention.

Therefore, in the infrared observation device in accordance with the present invention, a highpass filter 5 that has a reverse frequency transfer characteristic to the first inclination-attenuated frequency transfer characteristic as a transfer characteristic of the optical and scanning system 1, before or after the lowpass filter 3 as shown in FIG. 3, is provided.

Further, a two-stage cascade-connected second lowpass filter 6 that has a reverse frequency transfer characteristic in approximity to a SINC function as the transfer characteristic of the infrared detector 2, may be provided before or after the lowpass filter 3.

A highpass filter 5 will be described with reference to FIG. 3.

In FIG. 3, the highpass filter 5 is provided in the prior stage of the lowpass filter 3, in order to prevent a noise in the high frequency region of an analog/digital conversion from falling into a low frequency region by sampling. A set of filters 3, 5 and 6 are regarded as an electrical circuit system 30 and if the frequency transfer characteristic of the electrical circuit is regarded as $MTF_{CCT}$ and that of the display unit 4 is regarded as $MTF_{DIS}$, the frequency transfer characteristic $MTF_{TOT}$ of a total infrared observation device is represented by the following formula from the multiplication of each MTF of a respective transfer system.

$$MTF_{TOT} = MTF_o \times MTF_D \times MTF_{CCT} \times MTF_{DIS}$$

Therefore, since $MTF_{CCT}$ of the electrical circuit system has a reverse characteristic, $$MTF_{CCT} = (1/MTF_o)(1/MTF_D)(1/MTF_{DIS}) = F1 \cdot F2 \cdot F3$$

Nevertheless, since two frequency transfer characteristics $MTF_o$ and $MTF_D$ are regarded as predominant in the total MTF of the infrared observation system, F3 is omitted, or is equal to 1.

Therefore, if $$MTF_{TOT} \approx MTF_o \times NTF_D \times MTF_{CCT} = 1 \text{ (ideal value)},$$

$$MTF_{CCT} = (1/MTF_o)(1/MTF_D) = F1 \cdot F2$$

will do and the correction is performed by the electrical circuit system.

From the formula (1) and (2)

$$MTF_{CCT} = \frac{1}{(1 - f_s/P_o)} \cdot \frac{1}{\operatorname{Sin}(\pi \cdot f_s \cdot \Omega)/(\pi \cdot f_s \cdot \Omega)} \quad (4)$$

where $P_o = 1/(\text{inclination})$.

In an MTF vs.fs curve, an inclination to a horizontal line from a point 1 is represented by $\theta(f) = 1 - (1/P_o) \cdot f_s$ and if an inclination is known, an inclination is equal to $1/P_o$. In general, since $\theta(f)$ representing an MTF of an optical and scanning system is given, $P_o$ is also determined.

In the right side of the formula (4), the first term is $F1 = 1/(1 - f_s/P_o)$ and the second term is a function that is a reciprocal of the SINC function. Thus, if we set a $= 1/(P_o \cdot \pi \cdot \Omega)$ and $x = \pi \cdot f_s \cdot \Omega$, because in the relevant spatial frequency region (0 to $\frac{1}{2}\Omega$ in FIG. 2) of the first term $F1 = 1/(1 - f_s/P_o)$, $f_s/P_o$ is regarded as $f_s/P_o \ll 1$, then $$F1 = 1/(1 - f_s/P_o) \approx 1 + f_s/P_o \ldots \quad (5)$$

Because $$F_1 = \frac{1}{1 - f_s/P_o} = \frac{1 - f_s/P_o + f_s/P_o}{1 - f_s/P_o} = 1 + \frac{f_s/P_o}{1 - f_s/P_o}$$

and if $1 \gg f_s/P_o$, then, since $F_1 \approx 1 + f_s/P_o$, $F_1 \approx F' = 1 + f_s/P_o$, and if $a \cdot x = f_s/P_o$, then $F_1 \approx 1 + ax$.

From the formula (5), the desired compensation is performed by an electrical circuit having a transfer function that the first term is $(1+ax)$, where $ax=f_s/P_o$.

In this case, if a general frequency in the video frequency band is f, the condition of f is $$0 < f_1 < < f \leq f_{max} < f_2,$$

where $f_1$ is a first frequency, and $f_2$ is a second frequency and $f_2$ is larger than the maximum frequency $f_{max}$ of video f.

Suppose that a transfer function of a highpass filter 5 is F1, then $$F1 \approx (1+ax).$$

In order to make a frequency characteristic flat, it is necessary to provide for a parallel function F1' having the same inclination ax.Viz., $$F1' = K + ax \text{ (K is a contant)}$$

If $a' = a/K$, then $F1' = K(1+a'x)$ $$F1' = K(1+a'x) = K[(1+a'x)^2]^{\frac{1}{2}}$$

where $1 < < (a'x)^2$ is supposed, then $$F1' \approx K \cdot [1+(a'x)^2]^{\frac{1}{2}}$$

Thus, if $K = R_2/(R_1+R_2)$, $(a'x)^2 = f/f_1$, then $$F_1' \approx [R_2/(R_1+R_2)] \cdot [1+(f/f_1)^2]^{\frac{1}{2}} \ldots \quad (6)$$

Figure 4:
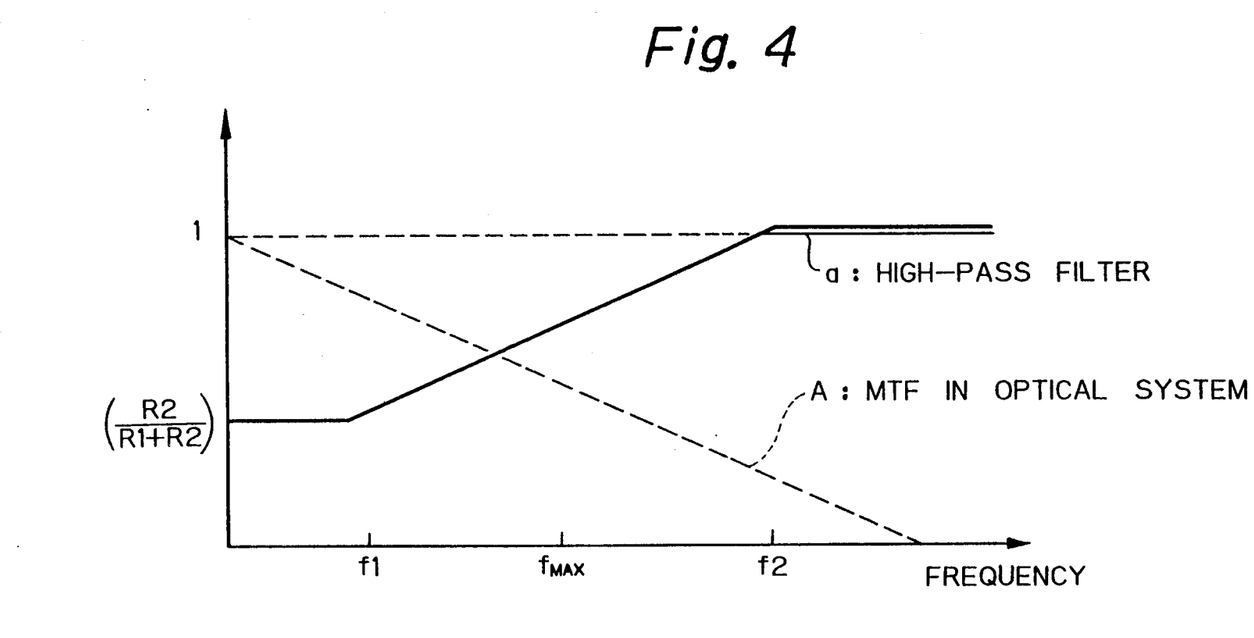
FIG. 4 is a frequency transfer characteristic diagram of a highpass filter in accordance with the present invention with reference to an MTF characteristic of an optical system.

Next, suppose that a frequency band f is $$0 < f < f_2, \text{ and } f_1 < < f_2,$$

the $F_1'$ term of the formula (6) is substituted by the next function.

$$F1' \approx \left[ \frac{R_2}{R_1+R_2} \right] \cdot \left| \frac{1+j(f/f_1)}{1+j(f/f_2)} \right| \quad (7)$$

where $f_1 = \frac{1}{2}\pi CR_1$ and $f_2 = \frac{1}{2}\pi CR_1R_2/(R_1+R_2)$,

Since the formula (7) represents a kind of highpass filter and has a frequency transfer characteristic a as shown by a solid line in FIG. 4, it is a reverse characteristic of the frequency transfer characteristic (A) in the optical and scanning system 1 as shown by a broken line and can act to cancel the characteristic A.

Next, since it is difficult for the second function for compensation in the right side of the formula (4) to be treated in the intact state as the function $F2=1/\text{sinc}(x)$, the function is represented by a series approximation method $$1/F2 = \text{sinc}(x) = \left[ 1 - \frac{x^2}{3!} + \frac{x^4}{5!} \ldots \right]. \quad (8)$$

where sinc(x) is used for processing in the approximation region $$x = \pi \cdot f_s \cdot \Omega < 1,$$

where $f_s$ is a spatical frequency and $\Omega$ is an instantaneous field of vision to be detected.

In the formula (8), since $\frac{1}{3!} = k_1 = 1/6$, $1/5! = k_2 = 1/120$ and $\times < 1$, if the-after-$x^6$ is neglected, the formula (8) is approximated as follows.

$$1/F2 = \text{sinc}(x) \approx 1/F2' = 1 - k_1 x^2 + k_2 x^4 \ldots \quad (9)$$

On the other hand, it is known that the transfer function of the second lowpass filter 6 shown in FIG. 3 is generally represented as follows (Refer to a publication "The design of an active filter" by T. Yanagisawa, Sampoh Pub. Co. P. 27, lines 1 to 2, $$F2_{LPF}(S) = (H \cdot \omega_0^2)/[S^2 + (\omega_0/Q)S + \omega_0^2] \ldots \quad (10)$$

where S is a Laplacean and since $S = j\omega$ in the frequency region, the expression is modified as follows.

$$\begin{aligned}
H/(L_{pLPF}(S)) &= [S^2 + (\omega_0/Q)S + \omega_0^2]/(\omega_0^2) \\
H/(L_{pLPF}(j\omega)) &= [(j\omega)^2 + (\omega_0/Q)(j\omega) + \omega_0^2]/(\omega_0^2) \\
&= -\omega^2/\omega_0^2 + j(1/Q)(\omega/\omega_0) + 1 \\
H/(L_{pLPF}(X)) &= -X^2 + j(1/Q)X + 1
\end{aligned}$$

where $\omega/\omega_0 = X$.

The above expression is a form of complex number (vector representation) and if an absolute value (ABS) of the expression is taken in order to make it transform into a transfer function of scaler quantity, $$\begin{aligned}
ABS[H/L_{PLF}(X)] &= [(1-X^2)^2 + (1/Q)^2 X^2]^{\frac{1}{2}} \quad (11) \\
&= [1 - 2X^2 + (1/Q)^2 X^2 + X^4]^{\frac{1}{2}} \\
&= [1 - [2+(1/Q)^2]X^2 + X^4]^{\frac{1}{2}}
\end{aligned}$$

The formula (11) is similar to a square root of a reverse SINC function as stated in the formula (9).

As described above, since $X = \omega/\omega_0$ and $x = \pi \cdot f_s \cdot \Omega$, if $k_2 x^4 = X^4$ and $kx^2 = [2+(1/Q)^2]X^2$, the formula (9) is equal to the formula (11).

In order to relate the formula (9) with the formula (11), from the relation of the electrical frequency and the spatial frequency as shown in the formula (3), $$f = [\theta/(T \cdot \eta)]f_s,$$

$\omega_0$ and Q are found. Then, a second lowpass filter 6 having an approximately reverse characteristic to the SINC function such that an amplitude is lifted rapidly in a resonance point $f_0$ ($f_0 = \omega_0/2\pi$) in the high frequency region.

Therefore, we obtain $$F2' = [(L_{pLPF}(S))/H]^2 \ldots \quad (12)$$

where H is a constant.

Figure 5:
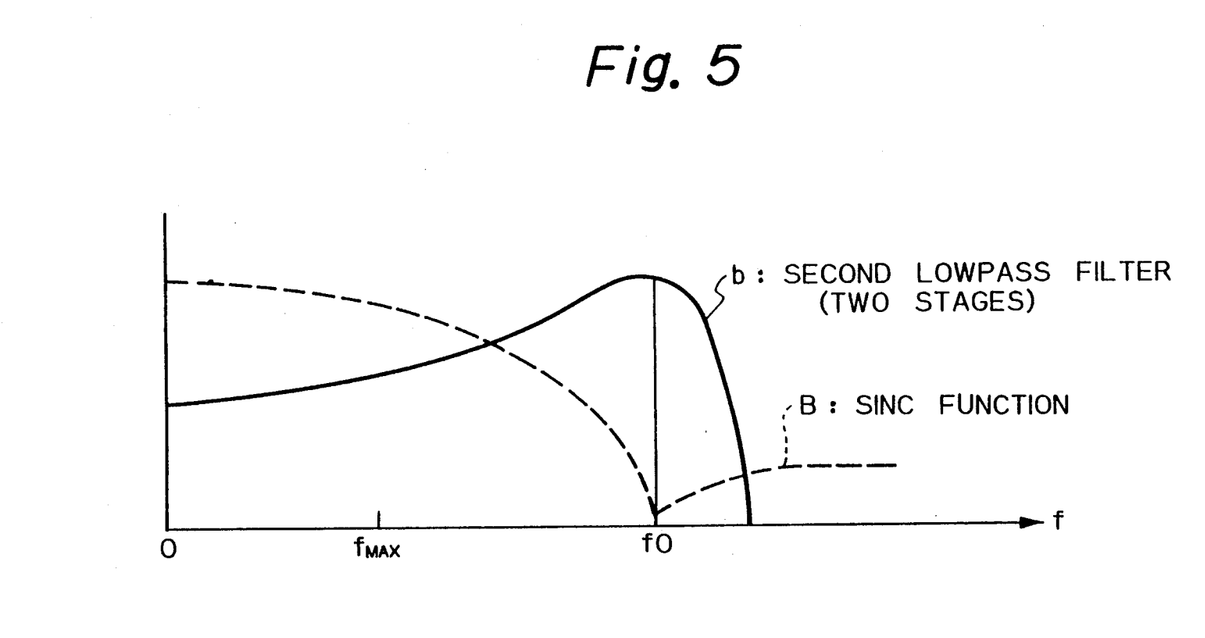
FIG. 5 is a curve of a frequency transfer characteristic of a reverse SINC function with regard to a second lowpass filter according to the present invention.

Next, a well-known second lowpass filter is cascade-connected connected by two stages and, as shown in FIG. 5, the SINC function (having a characteristic B shown by a broken line in FIG. 5) is compensated by a characteristic (b), shown by a solid line, to correct the frequency characteristic.

Therefore, it is seen that a multi-stage correction of the frequency transfer characteristic having a frequency characteristic by means of SINC function can approximately compensate its attenuation characteristic by cascade-connecting the second lowpass filters by a multi-stage connection.

Based on a combination of such filters, when a frequency characteristic deteriorates by a first inclination, compensation can be carried out by a highpass filter and when it is an infrared detector having a characteristic of SINC function, compensation can be carried out by a second lowpass filter (of two stages). As a result, for example, if the MTF deterioration of the optical and scanning system 1 and the infrared detector 2 is compensated, the lowering of the high frequency region frequency component in the path from the infrared-ray emitting body to the optical and scanning system and the infrared detector is lifted up on the way and an infrared observing system that provides a flat frequency characteristic as a whole can be constituted.

As a result, with regard to a display screen of the display unit 4, the display from an observed object, such that the temperature variation rate of a high space frequency in the course of scanning of the optical system is rapid, becomes much less than the actual temperature difference and the observed object is scarcely viewed and the display unit is weaker. Further, with regard to a portion that changes abruptly, the change is smaller and the image of the edge grows dim. In accordance with the infrared observing system of the present invention, in a state as intact as the light incident to the optical lens, the temperature of the object as viewed (infrared-ray) can be displayed.

Figure 6:
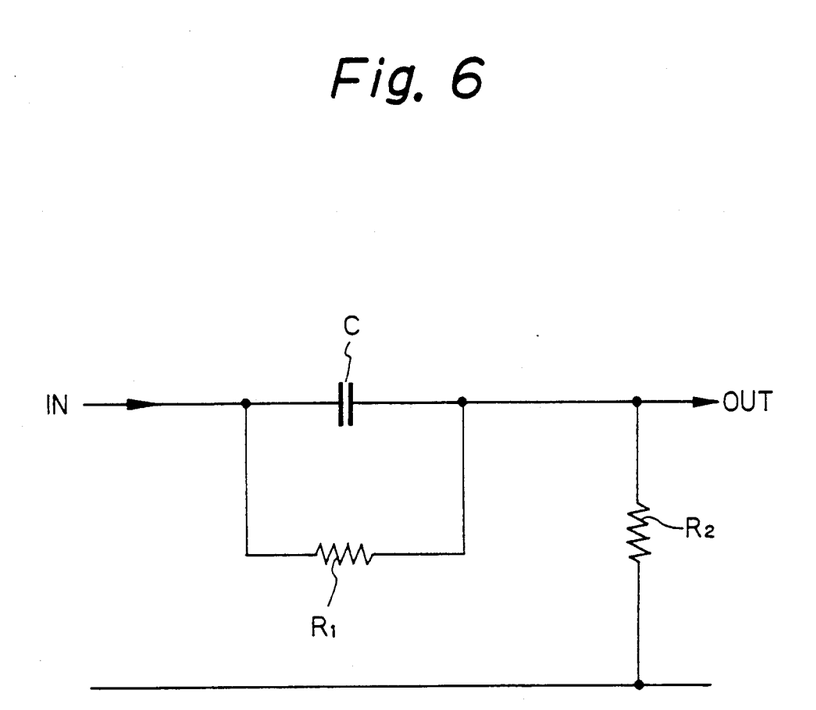
FIG. 6 is a circuit diagram of an embodiment of a highpass filter in accordance with the present invention.

FIG. 6 illustrates an embodiment of a highpass filter 5 shown in FIG. 3. A parallel circuit of a capacitor C and a resistor R1 is connected in series with a resistor R2 and a connecting point of the parallel circuit and the resistor R2 is an output terminal.

As shown in the frequency transfer characteristic in FIG. 4, as the frequency is in the low frequency region, and since such a highpass filter 5 is liable to be cut off by a capacitor C, if the values of the capacitor C and the resistors R1 and R2 are selected appropriately, the first inclination attenuated frequency transfer characteristic of the optical and scanning system 1 as shown in FIG. 1 can be compensated.

Figure 7:
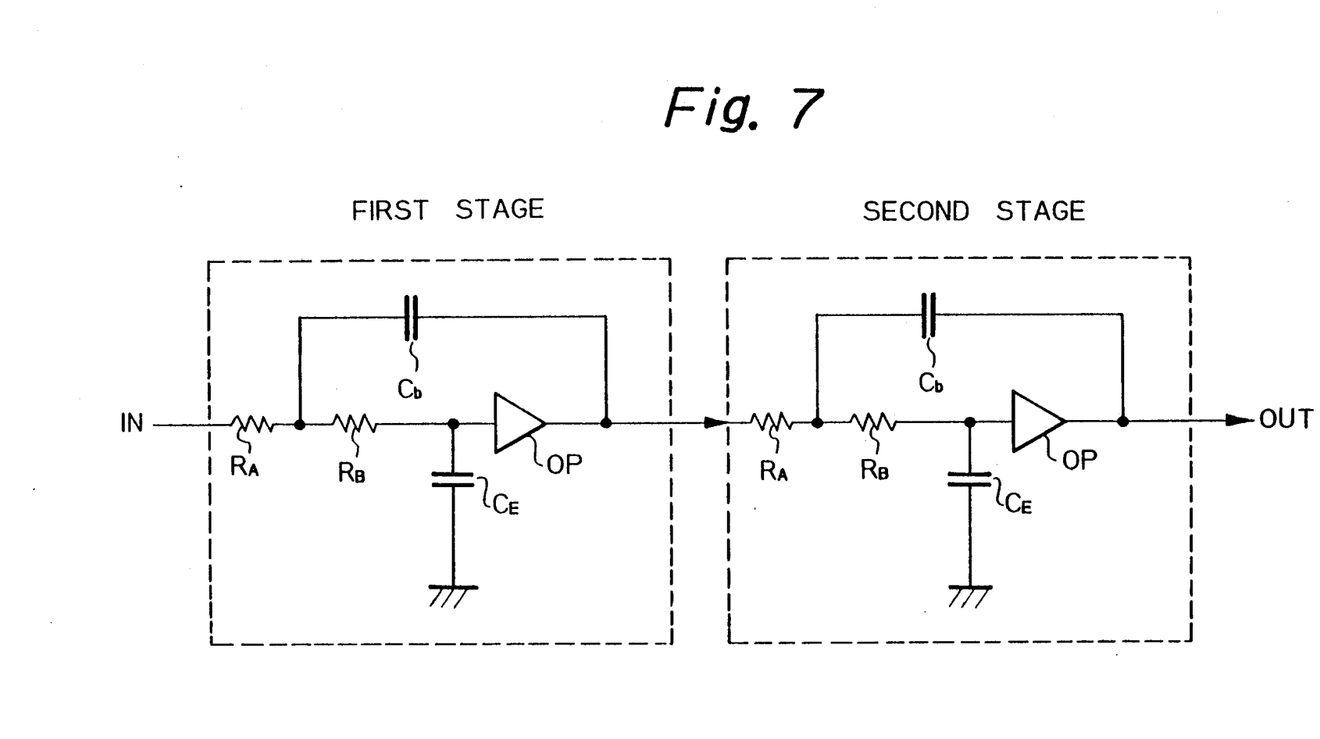
FIG. 7 is a circuit diagram of an embodiment of a lowpass filter in accordance with the present invention.

FIG. 7 illustrates an embodiment of a second lowpass filter as shown in FIG. 3. A lowpass filter is cascade-connected in two stages. East stage of the lowpass filter includes an operational amplifier OP, resistors $R_A$ and $R_B$ at the input side of the operational amplifier OP, a capacitor $C_E$ connected between an input terminal of the operational amplifier OP and the earth potential, and a capacitor $C_D$ connected between a connecting point of input resistors $R_A$ and $R_B$ and an output terminal of the operational amplifier OP.

Such a lowpass filter cuts off a high frequency component by the capacitor $C_E$ and a low frequency component is output by an intact amplitude. If the values of resistors $R_A$ and $R_B$ and capacitors $C_D$ and $C_E$ are selected appropriately (Refer to "The design of an active filter" by T. Yanagisawa, Books, Sanpoh Publishing Co., P. 27, lines 1 to 2), two-stage lowpass filters are formed by means of the above formula (12) and a frequency transfer characteristic using SINC function of the infrared detector 2 as shown in FIG. 2 can be compensated.

I claim:

1. An infrared observing system that, after an infrared-ray emitted from an optical/scanning system is converted into an infrared-ray image signal by an infrared detector, an unnecessary high frequency component of said infrared image signal is filtered by a lowpass filter to cut off a high frequency region noise and the output thereof is represented on a display unit, wherein before or after said lowpass filter, a highpass filter that has a reverse transfer frequency characteristic to a first inclination attenuated transfer frequency characteristic is provided.

2. An infrared observing system according to claim 1, wherein before said lowpass filter a second lowpass filter that has an approximation of a reverse transfer frequency characteristic of SINC function for showing a transfer characteristic of said infrared detector is cascade-connected therewith by at least two stages.

3. An infrared observing system according to claim 1, wherein after said lowpass filter, a second lowpass filter is cascade-connected therewith in at least two stages.

4. An infrared observing system according to claim 1, wherein the modulation transfer function of the whole electrical circuit system is represented by $$MTF_{CCT} = \frac{1}{(1 - f_s/P_o)} \cdot \frac{1}{\sin(\pi \cdot f_s \cdot \Omega)/(\pi \cdot f_s \cdot \Omega)}$$

where $MTF_{CCT}$ is a modulation transfer function of the whole electrical circuit system, $f_s$ is spatial frequency, $\Omega$ is an instantaneous field of view and $P_o \approx 1/$(inclination).

* * * * *